Aug. 16, 1960 F. J. BOMHARD 2,949,174
CLUTCH CONTROL

Filed March 15, 1956 2 Sheets-Sheet 1

INVENTOR
Franz Josef Bomhard,

BY Richardson, David & Nordon
ATTORNEYS

United States Patent Office 2,949,174
Patented Aug. 16, 1960

2,949,174

CLUTCH CONTROL

Franz Josef Bomhard, Schweinfurt, Germany, assignor to Firma Fichtel & Sachs A.G., Schweinfurt am Main, Germany, a corporation of Germany Filed Mar. 15, 1956, Ser. No. 571,753

Claims priority, application Germany Mar. 16, 1955

12 Claims. (Cl. 192—.08)

The present invention relates to novel means for automatically increasing the idling speed of internal combustion engines under a particular set of conditions. More particularly, it relates to novel means for increasing the idling speed of such engines provided with automatic clutches during shifting of gears when the clutch is disengaged.

Automotive vehicles have been provided with automatic clutches the engagement of which depends upon the speed of the engine, such as a centrifugal clutch. In the act of shifting gears, however, the clutch is disengaged in spite of the engine speed. If the gas pedal is let up during the act of shifting then the engine speed drops considerably and the clutch must be reengaged both with respect to its speed-dependent mechanism and its gear shifting mechanism. Reengagement of the clutch will require two stages and thus will be jerky rather than smooth. To overcome this rough reengagement it has heretofore been proposed to open the throttle valve of the carburetor at the same time that the clutch is disengaged as a result of shifting gears. Consequently, although the clutch is disengaged, the speed of the engine is not permitted to drop to idling speed and the speed-dependent mechanism is not affected, i.e., with a centrifugal clutch the centrifugal weights are not displaced. When shifting is completed only a single reengagement stage is necessary and the clutch reengagement is smooth and gradual.

An earlier arrangement for preventing the engine speed from dropping to idling speed during gear shifting is shown in U.S. Patent No. 2,766,862 issued to Richard Binder on October 16, 1956, and owned by the assignee of the present invention. In this Binder patent, the usual butterfly valve in the intake manifold is prevented from closing to its idling position during gear shifting, the butterfly valve being the same valve which is controlled by the accelerator pedal.

In conventional arrangements of this character, the connection between the gear shift mechanism and the throttle valve requires relatively large control forces to overcome the throttle valve return spring and the frictional forces in the joints of the coupling. In addition, the cost of the coupling was relatively high and it rendered disassembly of the carburetor difficult.

It is accordingly an object of the present invention to provide means independent of the throttle valve for increasing the idling speed when shifting gears of an internal combustion engine provided with an automatic clutch without any direct mechanical coupling to the throttle valve.

It is a further object of the invention to provide inexpensive means for increasing the idling speed during shifting, which means are readily accessible and which do not require excessive power for operation.

These and other objects and advantages are realized in accordance with the present invention wherein an auxiliary fuel-air mixture for increasing the idling speed is drawn in through a bore communicating with the inlet line beyond the throttle valve, i.e., in the suction part of the inlet line. The bore is normally closed off by a valve and is opened by displacement of the valve during the act of shifting gears. The valve can be displaced by pressure or electromagnetically, but preferably is opened as a result of the vacuum within the inlet line itself. The fuel ratio of this additional mixture can be adjusted in conventional manner by means of a fuel nozzle and a primary air nozzle independently of the adjustment of the carburetor.

A preferred embodiment of the invention will now be described more specifically with reference to the accompanying drawing, wherein:

A preferred embodiment of the invention will now be described more specifically with reference to the accompanying drawing, wherein:

Fig. 1 is an elevational view of an engine control mechanism associated with the invention. The centrifugal clutch, gear shifting lever, transmission and other non-illustrated portions of the arrangement are substantially as shown and described in Binder Patent No. 2,766,862 referred to above.

Fig. 3 is a sectional view on an enlarged scale of an air throttle employed in the structure of Fig. 2.

Figure 2:
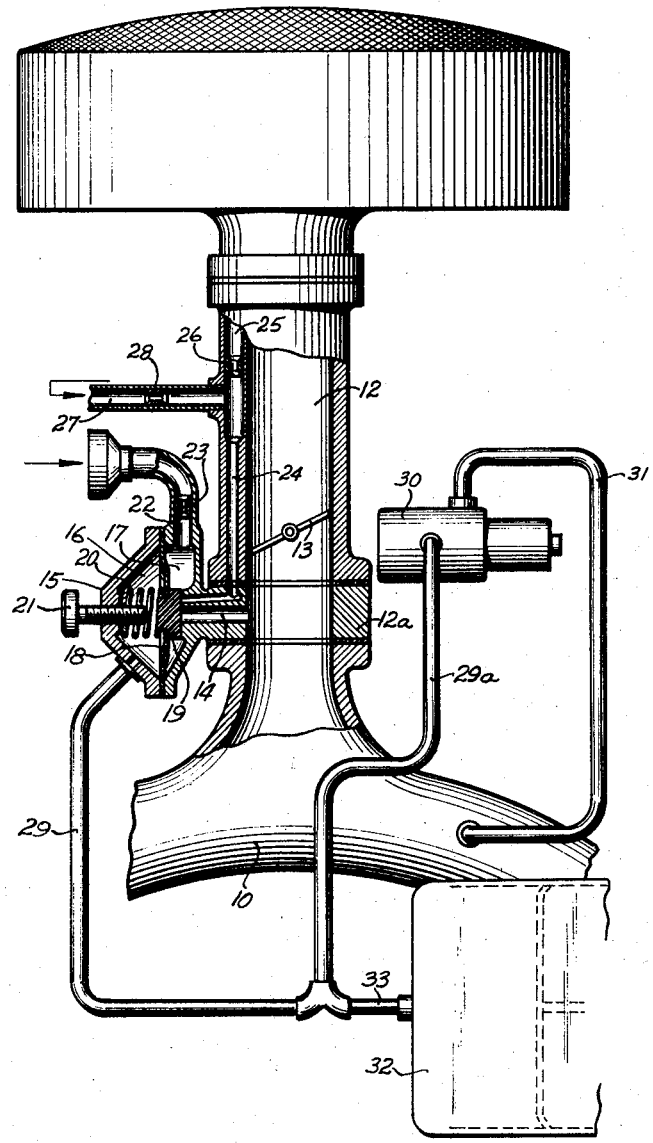
Fig. 2 is an elevational view of a portion of the fuel and air supply system of an internal combustion engine with certain parts broken away and shown in section.

Referring to Fig. 1, there is shown an engine control mechanism which includes a rod $b$ which actuates a clutch disengaging lever $c$ associated with a centrifugal clutch $d$. A steering column supports a steering wheel $e$ and a gear shifting lever $f$. Contacts $g$ are closed only during gear shifting. During gear shifting, a battery $h$ energizes a solenoid valve 30 (see Fig. 2) which simultaneously connects a servomotor 32 and a fuel control booster device housing 15 to an intake manifold 10.

Referring to Fig. 1, there is shown an engine control mechanism which includes a rod $b$ which actuates a clutch disengaging lever $c$ associated with a centrifugal clutch $d$. A steering column supports a steering wheel $e$ and a gear shift lever $f$. Contacts $g$ are closed only during gear shifting. During gear shifting, a battery $h$ energizes a solenoid valve 30 (see Fig. 2) which simultaneously connects a servomotor 32 and a fuel control booster device housing 15 to an intake manifold 10.

Air for mixing with fuel is drawn by the suction line or intake manifold 10 through air filter 11 and duct 12. The amount of air drawn in is regulated by the throttle valve 13 which is controlled in conventional manner by the gas pedal of the vehicle (not shown). Between the throttle valve 13 and the line 10 a bore 14 is provided in an annular pipe section 12a interposed between duct 12 and manifold 10.

The bore 14 leads into a valve casing 15, subdivided into two chambers 16, 17 by means of a diaphragm 18. The diaphragm 18 is secured, e.g., by vulcanization, to an elastic valve body 19, the valve body being urged by a spring 20 to close off the communication between bore 14 and chamber 17. The closing force of spring 20 is adjustable by means of set screw 21. An auxiliary air inlet 22 provided with an air throttle 23, shown on an enlarged scale in Fig. 3, communicates with chamber 17 but the air cannot pass to passageway 12 and suction line 10 because of valve body 19 which closes off chamber 17. An auxiliary passageway 24 from the float chamber of the carburetor also communicates with chamber 17 but the communication is also cut off because of the disposition of valve body 19. The passageway 24 is subdivided into an air conduit 25 extending from the air filter 11 and provided with an air nozzle or throttle 26, and a fuel conduit 27 extending from the float chamber (not shown) and provided with a fuel nozzle 28.

The chamber 16 of the valve casing 15 is connected by means of a conduit 29, 29a with a master control valve 30 which in turn is connected with the suction line 10 by means of conduit 31. A servomotor 32 which effects disengagement of the clutch on shifting of the gears communicates by means of pipe 33 with pipe 29. In this manner, by opening master control valve 30 both chamber 16 and servomotor 32 are placed under the suction prevailing within suction line 10. The master control valve 30 may be operated by the conventional manual gear shift lever (not shown).

In normal operation of the vehicle the elements are positioned as shown in the drawing, and the engine speed will depend upon the extent to which the throttle valve 13 is opened as a result of the depression of the gas pedal (not shown). When it is desired to shift gears, the manual gear shift lever is moved from one position to another and the act of movement causes master control valve 30 to open. Servomotor 32 is placed under suction to disengage the clutch, shift the gears and reengage the newly selected gears in conventional manner. Simultaneously, chamber 16 is placed under suction and diaphragm 18 is withdrawn to the left carrying valve body 19 therewith against the urging of spring 20. As a result auxiliary passageway 24 communicates with chamber 17 and the gas and air mixture flowing through passageway 24 mixes with air supplied to chamber 17 through inlet 22. At the same time, bore 14 is uncovered and the chamber 17 is in communication with manifold 10 through pipe section 12a so that the auxiliary fuel-air mixture is drawn into manifold 10. The speed of the engine is thereby increased at the same time that the clutch is disengaged by servomotor 32. When the new gear has been selected, the clutch reengagement is effected smoothly since the idling speed has not been permitted to become so low as to maintain the clutch disengaged even after completion of the gear shifting operation.

The increased idling speed of the engine during gear shifting will depend upon the extent to which the valve body 19 is permitted to open as determined by the setting of screw 21. It will also depend upon the sizes of the bores in the air throttles 23 and 26. Conveniently, the throttles can be employed for crude adjustment and the set screw 21 can be used to effect an exact adjustment.

The novel arrangement does not act directly on the throttle and thus overcomes the shortcomings of previous structures. At the same time the carburetor is not encumbered since only a single additional line 24 is connected thereto. The structure is simple and relatively inexpensive to manufacture and install.

In manufacture, the passageway 24 and air conduit 25 can be cast integrally with the duct 12. The annular pipe section 12a in the embodiment shown, is made integral with a portion of the valve casing and the air inlet 22. This pipe section is then welded or otherwise joined to the duct 12 and the suction line 10, as shown. The particular design and fabricating details may be otherwise modified.

Various additional changes and modifications may be made without departing from the spirit and scope of the present invention and it is intended that such obvious changes and modifications be embraced by the annexed claims.

What I claim is:

1. In an internal combustion engine having a suction line for drawing in air, a throttle, a speed-responsive clutch, a transmission, gear shifting means for selecting a desired gear ratio within said transmission, and means responsive to gear shifting actuation of said gear shifting means for causing disengagement of said clutch during gear shifting, the improvement comprising the combination of auxiliary fuel supply means communicating with said suction line below said throttle, and a valve normally closing off communication of said auxiliary fuel supply means with said suction line, said valve being controlled by said gear shifting means, whereby upon disengagement of said clutch during gear shifting said valve is displaced and additional fuel is supplied to said suction line to thereby increase the idling speed of said engine.

2. The combination defined in claim 1, wherein said auxiliary fuel supply means comprises a fuel conduit extending from the primary fuel supply and an air conduit.

3. The combination defined in claim 2, including fuel nozzle means and air nozzle means in said fuel conduit and said air conduit, respectively.

4. The combination defined in claim 2, including additional air inlet means communicating with said suction line, said communication normally being closed off by said valve.

5. The combination defined in claim 4, including throttle means disposed in said air inlet means.

6. The combination defined in claim 1, including a valve casing surrounding said valve and defining a chamber communicating with said suction line, said communication normally being closed off by said valve, said auxiliary fuel supply means communicating with said chamber.

7. The combination defined in claim 6, wherein said valve normally closes off the communication of said chamber with both said auxiliary fuel supply means and said suction line.

8. The combination defined in claim 1, including a diaphragm secured to said valve for displacement therewith, pipe means extending from said diaphragm to said suction line, and a master control valve normally closing off said pipe means, said master control valve being operatively connected with said gear shifting means, whereby upon actuation of said gear shifting means said master control valve is opened so that said diaphragm is subjected to the vacuum within said suction line, said diaphragm thereby being displaced to establish communication between said auxiliary fuel supply means and said suction line.

9. The combination defined in claim 1, including spring means normally urging said valve into closing position, and set screw means for predetermining the displacement of said valve.

10. The combination as defined in claim 9, including additional air inlet means communicating with said suction line, said communication normally being closed off by said valve, and throttle means in said air inlet means, said throttle means serving for rough setting of the increased idling speed and said set screw means serving for fine adjustment of the increased idling speed.

11. In an internal combustion engine having an air filter, a suction line for drawing in filtered air which air in turn draws in fuel, a throttle controlling air drawn into said suction line, a clutch disengageable upon reduction of the engine speed beyond a predetermined minimum and disengageable upon shifting gears regardless of the engine speed, and manually operable gear shifting means; the improvement comprising means for increasing the idling speed of said engine during gear shifting comprising a valve casing, a displaceable diaphragm subdividing said casing into two chambers one of which communicates with said suction line beyond said throttle, auxiliary fuel supply means and air inlet means communicating with said one chamber, a valve connected to said diaphragm for displacement therewith, said valve normally closing off the communication between said one chamber and said suction line, pipe means connecting the other of said chambers with said suction line, and a master control valve normally closing off said pipe means, said master control valve being operatively connected with said gear shifting means, whereby upon operating said gear shifting means said master control valve is opened and said other chamber is placed under the suction of said suction line to thereby displace said diaphragm and permitting free communication of said air inlet means and said auxiliary fuel supply means with said suction line through said one chamber to thereby increase the idling speed of said engine.

12. An engine as defined in claim 11, including suction actuated servomotor means controlling disengagement of said clutch upon shifting of gears, said servomotor means communicating with said pipe means between said other chamber and said master control valve, whereby opening of said master control valve simultaneously initiates disengagement of the clutch and increase of the idling speed.

References Cited in the file of this patent

UNITED STATES PATENTS

| | | |
|---|---|---|
| 2,215,679 | Whittington | Sept. 24, 1940 |
| 2,294,823 | Andres | Sept. 1, 1942 |
| 2,568,958 | Hey et al. | Sept. 25, 1951 |
| 2,622,711 | Chambonneau | Dec. 23, 1952 |

UNITED STATES PATENT OFFICE

CERTIFICATION OF CORRECTION

Patent No. 2,949,174 — August 16, 1960

Franz Josef Von Bomhard

It is hereby certified that error appears in the above numbered patent requiring correction and that the said Letters Patent should read as corrected below.

In the grant, line 1, for "Franz Josef Bomhard, of Schwinfurt, Germany," read -- Franz Josef Von Bomhard, of Schweinfurt, Germany, --; in the heading to the printed specification, line 3, name of inventor, for "Franz Josef Bomhard" read -- Franz Josef Von Bomhard --; in the drawings, Sheets 1 and 2, at top of page, line 1, for "F. J. Bomhard", each occurrence, read -- F. J. Von Bomhard --; also in the drawings, Sheets 1 and 2, in the lower righthand corner, for "Franz Josef Bomhard", each occurrence, read -- Franz Josef Von Bomhard --.

Signed and sealed this 18th day of April 1961.

(SEAL)
Attest:

ERNEST W. SWIDER

Attesting Officer

DAVID L. LADD

Commissioner of Patents